United States Patent
Yoo et al.

(10) Patent No.: US 9,551,861 B2
(45) Date of Patent: Jan. 24, 2017

(54) DISPLAY DEVICE

(71) Applicant: Samsung Display Co., LTD., Yongin, Gyeonggi-Do (KR)

(72) Inventors: Byung-Han Yoo, Seoul (KR); Moon-Gyu Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 34 days.

(21) Appl. No.: 14/333,701

(22) Filed: Jul. 17, 2014

(65) Prior Publication Data
US 2015/0228209 A1    Aug. 13, 2015

(30) Foreign Application Priority Data

Feb. 7, 2014    (KR) .................. 10-2014-0014172

(51) Int. Cl.
| | | |
|---|---|---|
| *G02B 5/08* | (2006.01) | |
| *G02B 23/16* | (2006.01) | |
| *G02B 17/00* | (2006.01) | |
| *G02B 27/10* | (2006.01) | |
| *G02B 27/14* | (2006.01) | |

(52) U.S. Cl.
CPC ......... *G02B 17/006* (2013.01); *G02B 27/1066* (2013.01); *G02B 27/143* (2013.01)

(58) Field of Classification Search
CPC . B60R 1/12; B60R 2001/1215; H04N 9/3147; H04N 5/66; G02F 2001/133562; G02F 1/133524; G02F 1/13336; H01L 27/3293; H01L 27/32; G03B 37/04; G09F 9/33; G09F 9/30; G09F 9/40

USPC ....... 359/601–614, 507, 511, 513, 514, 839; 349/58–60, 155–158; 345/30, 32; 353/97, 353/119

See application file for complete search history.

(56) References Cited

U.S. PATENT DOCUMENTS

| | | | |
|---|---|---|---|
| 7,414,594 B2 | 8/2008 | Kim et al. | |
| 2010/0238090 A1 | 9/2010 | Pomerantz et al. | |
| 2011/0025594 A1* | 2/2011 | Watanabe | G02F 1/13336 345/102 |
| 2011/0255301 A1* | 10/2011 | Watanabe | G02F 1/13336 362/558 |
| 2011/0279487 A1 | 11/2011 | Imamura et al. | |
| 2012/0008340 A1 | 1/2012 | Tomotoshi et al. | |
| 2012/0273000 A1* | 11/2012 | Jing | C09D 1/00 134/4 |
| 2013/0235560 A1 | 9/2013 | Etienne et al. | |
| 2015/0055218 A1 | 2/2015 | Yoo et al. | |

FOREIGN PATENT DOCUMENTS

| | | |
|---|---|---|
| JP | 3699456 B2 | 7/2005 |
| KR | 1020140068626 A | 6/2014 |

* cited by examiner

*Primary Examiner* — Rahman Abdur

(74) *Attorney, Agent, or Firm* — Cantor Colburn LLP

(57) ABSTRACT

A display device includes a display panel, and an optical assembly on the display panel. The display panel includes a display area configured to display an image, and a peripheral area adjacent to the display area. The optical assembly overlaps the display area and the peripheral area. The optical assembly includes a supporting member overlapping the peripheral area, an optical member, a covering member covering the display panel, and a transparent member between the display panel, the optical member and the covering member. The optical member includes a first face contacting the display area, a second face opposite to the first face and tilted with respect to the first face, a third face contacting the supporting member, and a fourth face opposite to the third face.

18 Claims, 7 Drawing Sheets

DISPLAY DEVICE

This application claims priority to Korean Patent Application No. 10-2014-0014172, filed on Feb. 7, 2014, and all the benefits accruing therefrom under 35 U.S.C. §119, the contents of which in its entirety is herein incorporated by reference.

BACKGROUND

1. Field

Exemplary embodiments of the invention relate to a display device. More particularly, exemplary embodiments of the invention relate to a display device capable of improving display quality at a peripheral region thereof.

2. Description of the Related Art

A flat display device such as a liquid crystal display device, a plasma display device, etc. may display a high-definition large display image by increasing a pixel resolution or a display area thereof. For example, a display panel of the liquid crystal display device may include an array substrate, an opposing substrate facing the array substrate, and a liquid crystal layer therebetween. The array substrate may include a plurality of pixel electrodes arranged in a matrix shape. The liquid crystal display device may further include an image driving part configured to apply voltages to the pixel electrodes. The image driving part may include, e.g., a circuit part configured to control an image signal.

SUMMARY

An image driving part may be disposed at a peripheral area of a flat display device so as to increase a display area of the flat display device. Accordingly, the display area of the flat display device may be restricted in size due to the location of a circuit part in the image driving part. If a flat display device includes a plurality of display panels and the display panels are configured to collectively display an entire single image, the single image may be actually displayed on the flat display device as divided sub-images on each of the display panels due to respective peripheral areas of the display panels.

One or more exemplary embodiment of the invention provides a display device capable of displaying an image at a peripheral area of a display screen thereof.

In an exemplary embodiment of a display device according to the invention, the display device includes a display panel and an optical assembly on the display panel. The display panel includes a display area configured to display an image, and a peripheral area adjacent to the display area. The optical assembly overlaps the display area and the peripheral area. The optical assembly includes a supporting member overlapping the peripheral area, an optical member, a covering member covering the display panel, and a transparent member between the display panel, the optical member and the covering member. The optical member includes a first face contacting the display area of the display panel, a second face opposite to the first face, a third face contacting the supporting member and a fourth face opposite to the third face. The second face is tilted with respect to the first face. The third face connects the first face and the second face. The fourth face connects the first face and the second face. The covering member contacts the second face of the optical member.

In an exemplary embodiment, the optical member may include a plurality of optical sheets each including a transparent film and a reflective film stacked therein.

In an exemplary embodiment, the peripheral area may extend in a first direction. The transparent film and reflective film may be stacked along a second direction substantially perpendicular to the first direction.

In an exemplary embodiment, a surface of the transparent film contacting the display panel may overlap a pixel row or a pixel column in the display area of the display panel.

In an exemplary embodiment, the transparent member may have a transmissivity equal to or greater than about 0.9.

In an exemplary embodiment, the transparent member may have a refractive index equal to or greater than about 1.0 and equal to or lower than about 3.0.

In an exemplary embodiment, the fourth face of the optical member may be reflective.

In an exemplary embodiment, the transparent member may include a first face contacting the display panel, a second face opposite to the first face of the transparent member, a third face contacting the fourth face of the optical member and a fourth face opposite to the third face of the transparent member. The second face of the transparent member may contact the covering member. The fourth face of the transparent member may contact the covering member.

In an exemplary embodiment, the second face of the optical member and the second face of the transparent member may be flat surfaces tilted by a substantially same angle with respect to the display panel.

In an exemplary embodiment, the second face of the optical member and the second face of the transparent member may be continuously connected as a curved face with respect to the display panel.

In an exemplary embodiment, a portion of the covering member contacting the fourth face of the transparent member may be reflective.

In an exemplary embodiment, a first width of the third face of the transparent member, overlapping the display panel, may be greater than a second width of the fourth face of the transparent member, overlapping the display panel.

In an exemplary embodiment, a first angle between the first and the fourth faces of the optical member may be substantially the same as a second angle between the first and the fourth faces of the transparent member.

In an exemplary embodiment, a lower surface of the supporting member may contact the display panel. A width of the supporting member, overlapping the display panel, may decrease from the lower surface to a top of the supporting member.

In an exemplary embodiment, the supporting member may have a triangular shape in a cross-sectional view.

In an exemplary embodiment of a display device according to the invention, the display device includes a plurality of display panels, and a plurality of optical assemblies respectively on the display panels. The display panels include a display area configured to display an image, and a peripheral area adjacent to the display area, respectively. Each of the optical assemblies overlaps the display area and the peripheral area of a respective display panel. Each of the optical assemblies includes a supporting member overlapping the peripheral area, an optical member, a covering member covering the respective display panel, and a transparent member in a space between the optical member, the covering member and the respective display panel. The optical member includes a first face contacting the display area of one of the display panels, a second face opposite to the first face, a third face contacting the supporting member and a fourth face opposite to the third face. The second face is tilted with respect to the first face. The third face connects the first face and the second face. The fourth face connects the first face and the second face. The covering member contacts the second face of the optical member.

In an exemplary embodiment, the optical member may include a plurality of optical sheets each including a transparent film and a reflective film stacked therein.

In an exemplary embodiment, the transparent member may have a transmissivity equal to or greater than about 0.9.

In an exemplary embodiment, the transparent member may include a first face contacting the respective display panel, a second face opposite to the first face of the transparent member, a third face contacting the fourth face of the optical member and a fourth face opposite to the third face of the transparent member. The second face of the transparent member may contact the covering member. The fourth face of the transparent member may contact the covering member.

In an exemplary embodiment, a first width of the third face of the transparent member, overlapping the respective display panel, may be greater than a second width of the fourth face of the transparent member, overlapping the respective display panel.

According to one or more exemplary embodiment of the display device, the optical member and the transparent member may be disposed on a portion of the display area adjacent to the peripheral area, and the covering member may cover the optical member and the transparent member, thereby displaying an image on the peripheral area of the display device.

Also, the transparent member may be disposed in a space defined between the display panel, the optical member and the covering member, thereby reducing a border line displayed between the display area and the peripheral area which may be recognized as a luminance reduction due to the space.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Figure 1:
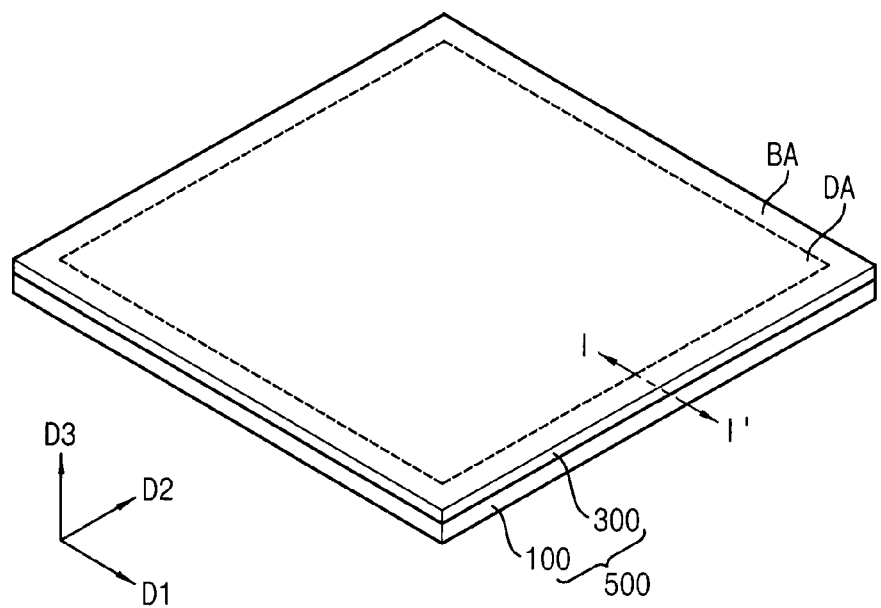
FIG. 1 is a perspective view illustrating an exemplary embodiment of a display device according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in further detail with reference to the accompanying drawings.

FIG. 1 is a perspective view illustrating an exemplary embodiment of a display device according to the invention.

Referring to FIG. 1, a display device 500 may include a display panel 100 and an optical assembly 300.

The display panel 100 may include a display area DA and a peripheral area BA. An image may be displayed on the display area DA. The peripheral area BA may be adjacent to the display area DA.

The display panel 100 may include, for example, an organic light emitting display panel, a liquid crystal display panel, an electro-wetting display panel, an electro-phoretic display panel, a micro-electro-mechanical system ("MEMS") display panel, a plasma display panel, etc.

In an exemplary embodiment, for example, if the display panel 100 is the liquid crystal display panel, the liquid crystal display panel may include an array substrate, an opposing substrate facing the array substrate, and a liquid crystal layer therebetween. The array substrate may include a plurality of gate lines, a plurality of data lines, a plurality of pixel electrodes and a plurality of switching elements. The data lines may cross the gate lines. The pixel electrodes may be electrically connected to the gate lines and the data lines through the switching elements. One of the array substrate and the opposing substrate may include a common electrode configured to form an electric field with the pixel electrodes.

In an exemplary embodiment, for example, if the display panel 100 is the organic light emitting display panel, the display panel 100 may include a plurality of organic light emitting structures configured to generate light. In an exemplary embodiment, for example, each of the organic light emitting structures may include a first electrode, a second electrode facing the first electrode, and an organic light emitting element disposed between the first electrode and the second electrode. The organic light emitting element may include, for example, a hole injection layer, a hole transfer layer, an emission layer, an electron transfer layer, an electron injection layer, etc.

In a plan view, the display panel 100 may have, for example, at least two pairs of sides substantially parallel with each other. Referring to FIG. 1, for example, the display panel 100 may have a pair of first sides extending elongated in a first direction D1 and a pair of second sides extending elongated in a second direction D2. The second direction D2 may be substantially perpendicular to the first direction D1, but the invention is not limited thereto. The first sides may be different from the second sides in length. The display panel 100 may be configured to display an image toward a third direction D3 substantially perpendicular to the first and the second directions D1 and D2.

The display area DA of the display panel 100 may be an area in which the image is configured to be displayed. In an exemplary embodiment, for example, a predetermined single image may be configured to be displayed in the display area DA. In another exemplary embodiment, for example, a sub-image into which a single image is divided may be configured to be displayed in the display area DA.

The peripheral area BA of the display panel 100 may be an area in which the image is not displayed. The peripheral area BA may be adjacent to the display area DA. In an exemplary embodiment, for example, the peripheral area BA may be an area overlapping or defined by a top cover, a top chassis, a bezel, etc. Although the peripheral area BA has a square ring shape surrounding the display area DA in FIG. 1, the planar shape of the peripheral area BA is not limited thereto. In exemplary embodiments, for example, the peripheral area BA may be disposed adjacent to at least one side of the display area DA. In an exemplary embodiment, for example, the peripheral area BA may be disposed adjacent to a single side or both sides of the display area and elongated along the second direction D2.

The optical assembly 300 may be disposed on the display panel 100 in the third direction D3. In an exemplary embodiment, for example, the optical assembly 300 may overlap the display area DA and the peripheral area BA of the display panel 100. In an exemplary embodiment, for example, the optical assembly 300 may entirely cover the display area DA and the peripheral area BA of the display panel 100, that is, extend between opposing outer edges of the display device 500 in the plan view.

Figure 2:
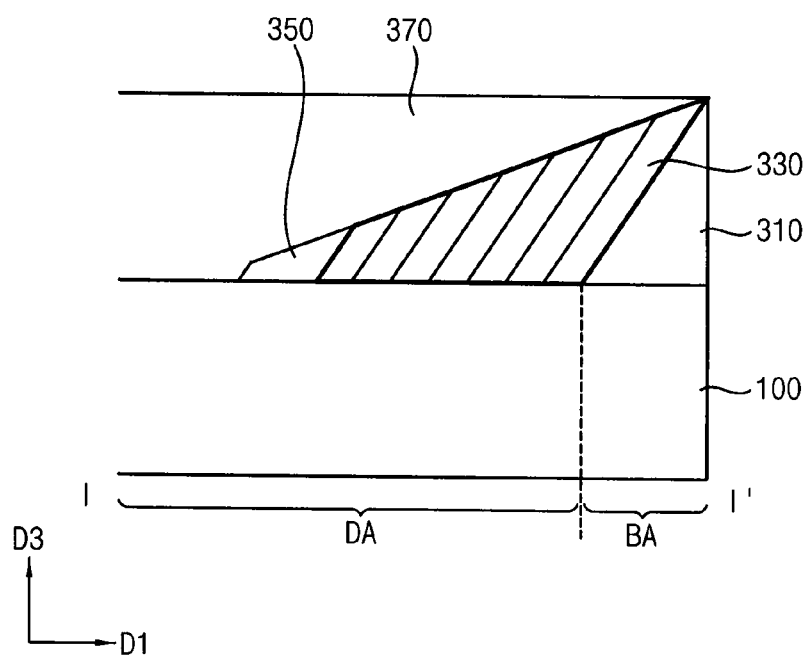
FIG. 2 is a cross-sectional view taken along line of I-I' in FIG. 1.

FIG. 2 is a cross-sectional view taken along line of IT in FIG. 1.

Referring to FIG. 2, the optical assembly 300 may include a supporting member 310, an optical member 330, a transparent member 350 and a covering member 370.

The supporting member 310 may overlap the peripheral area BA of the display panel 100. The supporting member 310 may overlap only the peripheral area BA of the display panel 100 and not overlap the display area DA of the display panel 100. In an exemplary embodiment, for example, a lower surface of the supporting member 310 may cover the peripheral area BA of the display panel 100. In an exemplary embodiment, for example, a width of the lower surface of the supporting member 310 along the first direction D1 may be substantially the same as a width of the peripheral area BA along the first direction D1. In the illustrated exemplary embodiment, a width of the supporting member 310 projected onto the display panel 100 may decrease from the lower surface to a top of the supporting member 310, in a cross-sectional direction. In an exemplary embodiment, for example, the supporting member 310 may have a triangular shape in a cross-sectional view taken along the first direction D1.

The optical member 330 may be disposed on the display panel 100. The optical member 330 may overlap a first portion of the display area DA. In an exemplary embodiment, for example, the optical member 330 may be disposed on a portion of the display area DA adjacent to the peripheral area BA. The optical member 330 may contact with the supporting member 310. The optical member 330 may include a plurality of optical sheets. The optical sheets may include transparent films and reflective films alternately stacked. In an exemplary embodiment, for example, the optical member 330 may include a structure in which the optical sheets alternately stacked along the first direction D1, include a tapered upper surface such as by cutting the stacked structure. Hereinafter, diagonal lines illustrated in the optical member 330 may be referred to the reflective films among the optical sheets. The optical member 330 may be described in detail referring to FIG. 3.

The transparent member 350 may be disposed on the display panel 100. The transparent member 350 may overlap a second portion of the display area DA adjacent to the first portion of the display area DA. In an exemplary embodiment, for example, the second portion of the display area DA may be closer to a center of the display area DA than the first portion of the display area DA. The transparent member 350 may contact with the optical member 330 and the display panel 100. The transparent member 350 may have a transmissivity equal to or greater than about 0.9. In an exemplary embodiment, for example, the transmissivity of the transparent member 350 may be equal to about 1.0. The transparent member 350 may have a refractive index in a range between about 1.0 and about 3.0. In an exemplary embodiment, for example, the refractive index of the transparent member 350 may be about 1.5. The transparent member 350 may include, e.g., a liquid material, a solid material, etc. In an exemplary embodiment, for example, the transparent member 350 may include water. In another exemplary embodiment, for example, the transparent member 350 may include an optical resin which is solidified beyond a predetermined temperature. In an exemplary embodiment, for example, the transparent member 350 may include a product of Dow Corning Co. such as Dow Corning® 0E-6630, Dow Corning® 0E-6636, Dow Corning® 0E-6652, etc. The transparent member 350 may be described in detail referring to FIG. 4.

The covering member 370 may contact with the display panel 100, the transparent member 350 and the optical member 330. The covering member 370 may entirely overlap the display panel 100 in the plan view. In an exemplary embodiment, for example, an upper surface of the covering member 370 may overlap the display area DA and the peripheral area BA of the display panel 100. In an exemplary embodiment, for example, an outline of the upper surface of the covering member 370 may be substantially the same as an outline of the display panel 100. A lower surface of the covering member 370 may partially overlap the display area DA of the display panel 100. A side surface of the covering member 370 may connect the upper and the lower surfaces of the covering member 370 to each other. The side surface of the covering member 370 may have a cross-sectional shape corresponding to a side surface collectively formed by the transparent member 350 and the optical member 330. In an exemplary embodiment, for example, the side surface of the covering member 370 may provide a desired space in cooperation with the supporting member 310 such that the optical member 330 and the transparent member 350 may be disposed within the desired space. The side surface of the covering member 370 may partially contact with the optical member 330. Also, the side surface of the covering member 370 may partially contact with the transparent member 350. The covering member 370 may include, e.g., a transparent material. In an exemplary embodiment, for example, the covering member 370 may include a transparent polymer resin, a glass, etc. In an exemplary embodiment, for example, the covering member 370 may include a polymethyl methacrylate ("PMMA").

Figure 3:
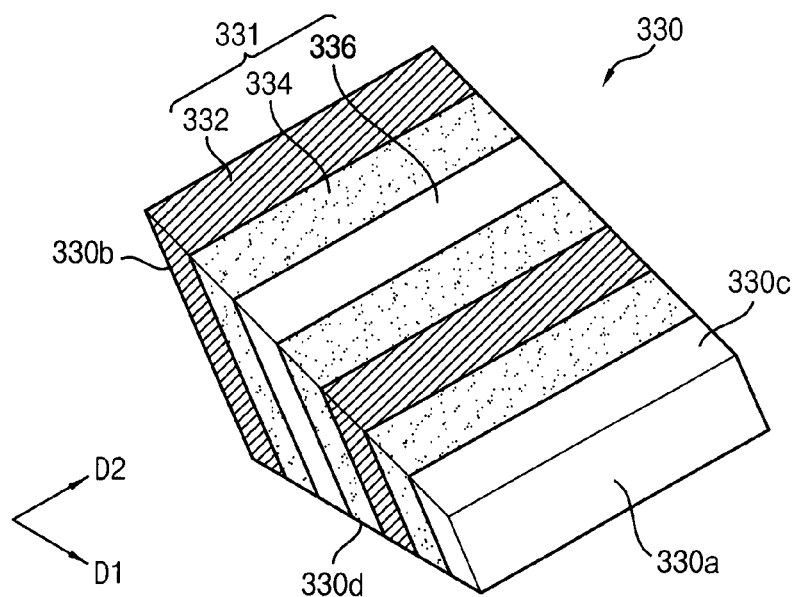
FIG. 3 is a perspective view illustrating a portion of an exemplary embodiment of an optical member in FIG. 2, according to the invention.

FIG. 3 is a perspective view illustrating an exemplary embodiment of a portion of an optical member in FIG. 2, according to the invention.

Referring to FIG. 3, the optical member 330 may include a transparent film 336, a reflective film 332 and an adhesive layer 334. The adhesive layer 334 may attach the transparent film 336 to the reflective film 332. The transparent film 336 may include a transparent material having a desired transmissivity. In an exemplary embodiment, for example, the transparent film 336 may include a polycarbonate ("PC"), a polyethylene terephthalate ("PET"), a polyurethane ("PU"), a polymethyl methacrylate ("PMMA"), etc. A refractive index of the transparent film 336 may be greater than a refractive index of the adhesive layer 334. The reflective film 332 may include a metallic material having a desired reflectance. In an exemplary embodiment, for example, the reflective film 332 may include aluminum (Al), silver (Ag), nickel (Ni), etc. The respective above-described materials for the transparent film 336 and the reflective film 332 may be used alone or in a combination thereof. The reflective film 332 may reflect light passing through the transparent film 336.

The optical member 330 may include a plurality of optical sheets 331 in which the transparent film 336, the adhesive layer 334 and the reflective film 332 are stacked. Respective interfaces of the stacked transparent film 336, the adhesive layer 334 and the reflective film 332 may be inclined in the third direction D3 with respect to the display panel 100. Planes of the layers 336, 334 and 332 of the optical member 330 are inclined in directions from the display area DA toward the non-display area BA, and from the display panel 100 to a viewing side of the display device 500. In an exemplary embodiment, for example, the optical member 330 may be defined by a desired section of a structure of the optical sheets 331 extended along the second and third directions D2 and D3 and stacked along the first direction D1. In an exemplary embodiment of manufacturing the display device, a stacked structure of optical sheets 331 may be cut at the desired section to form a tapered or inclined upper surface 330c of the optical member 330.

The optical member 330 may include the upper surface 330c, a lower surface 330d opposite to the upper surface 330c, a first side surface 330a, and a second side surface 330b respectively connecting the upper surface 330c and the lower surface 330d to each other. Although the optical member 330 includes two transparent films 336 and two reflective films 332 in FIG. 3, numbers of the transparent films 336 and the reflective films 332 stacked in the optical member 330 are not limited thereto. Although the first side surface 330a of the optical member 330 is defined by a surface of the transparent film 336 in FIG. 3, the surfaces of the optical member 330 are not limited thereto. In an exemplary embodiment, for example, the first side surface 330a of the optical member 330 may be defined by a surface of the reflective film 332. The lower surface 330d may be an incident surface to which a light or image is incident, and the upper surface 330c may be an exiting surface from which the light exits or at which the image is effectively displayed.

Figure 4:
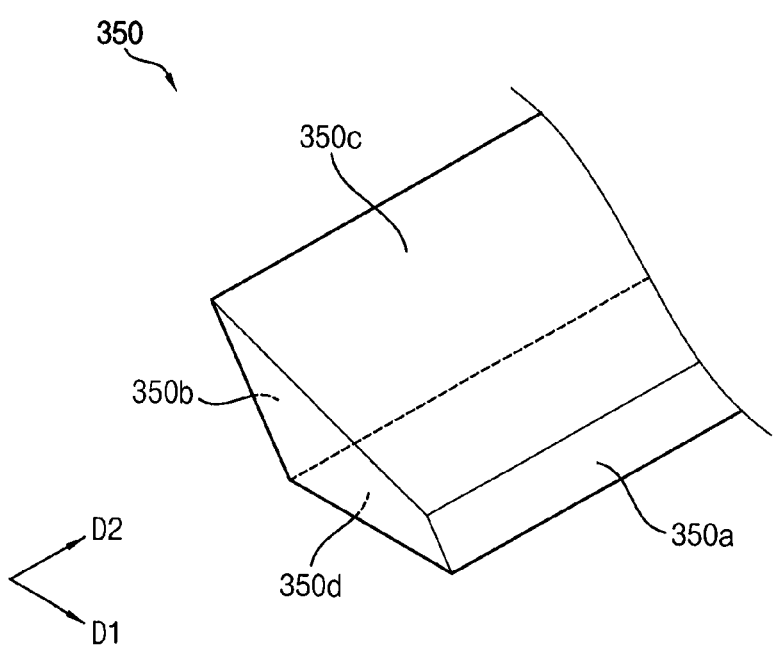
FIG. 4 is a perspective view illustrating a portion of an exemplary embodiment of a transparent member in FIG. 2, according to the invention.

FIG. 4 is a perspective view illustrating an exemplary embodiment of a portion of a transparent member in FIG. 2, according to the invention.

Referring to FIG. 4, if the transparent member 350 of the display device 500 includes a solid material, the transparent member 350 may have a columnar structure at least partially extending in the second direction D2. The transparent member 350 may include an upper surface 350c, a lower surface 350d opposite to the upper surface 350c, a first side surface 350a, and a second side surface 350b respectively connecting the upper surface 350c and the lower surface 350d to each other. Although the first side surface 350a of the transparent member 350 is substantially flat in FIG. 4, the shapes of the surfaces of the transparent member 350 are not limited thereto. In an exemplary embodiment, for example, the first side surface 350a of the transparent member 350 may be a curved surface or a bended surface.

Figure 5:
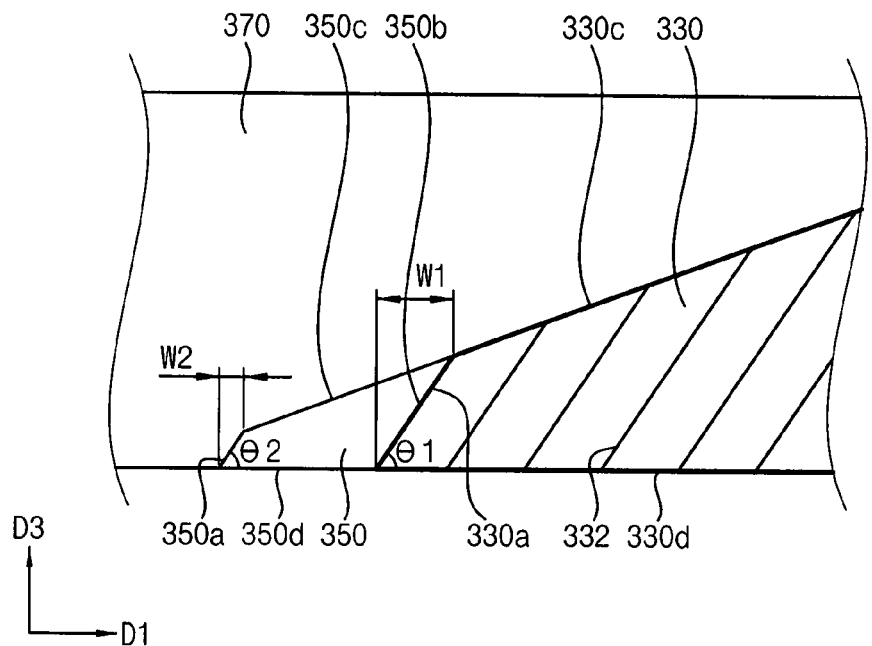
FIG. 5 is an enlarged cross-sectional view illustrating an exemplary embodiment of an optical member, a covering member and a transparent member in FIG. 2, according to the invention.

FIG. 5 is an enlarged cross-sectional view illustrating an exemplary embodiment of an optical member, a covering member and a transparent member in FIG. 2, according to the invention.

Referring to FIG. 2, FIG. 3, FIG. 4 and FIG. 5, the display device 500 may include the optical member 330, the transparent member 350 and the covering member 370 disposed on the display area DA of the display panel 100. The lower surface 330d of the optical member 330 may contact with the display panel 100. The upper surface 330c of the optical member 330 may contact with the covering member 370. The first side surface 330a of the optical member 330 may contact with the transparent member 350. In an exemplary embodiment, for example, the first side surface 330a of the optical member 330 may contact with the second side surface 350b of the transparent member 350. The second side surface 330b of the optical member 330 may contact with the supporting member 310. In the illustrated exemplary embodiment, the first side surface 330a of the optical member 330 may be a surface of the reflective film 332.

The lower surface 350d of the transparent member 350 may contact with the display panel 100. The upper surface 350c of the transparent member 350 may contact with the covering member 370. The first side surface 350a of the transparent member 350 may contact with the covering member 370. The second side surface 350b of the transparent member 350 may contact with the optical member 330. In an exemplary embodiment, for example, the second side surface 350b of the transparent member 350 may contact with the first side surface 330a of the optical member 330.

The covering member 370 may contact with the first side surface 350a and the upper surface 350c of the transparent member 350 and the upper surface 330c of the optical member 330.

The first side surface 350a of the transparent member 350 may be substantially parallel with the second side surface 350b of the transparent member 350. For example, a first angle θ1 between the display panel 100 and the second side surface 350b of the transparent member 350 may be substantially the same as a second angle θ2 between the display panel 100 and the first side surface 350a of the transparent member 350.

The upper surface 350c of the transparent member 350 may be in a substantially a same with the upper surface 330c of the optical member 330. In an exemplary embodiment, for example, the upper surface 350c of the transparent member 350 and the upper surface 330c of the optical member 330 may be respectively tilted by a same angle with respect to the display panel 100.

A first width W1 of the second side surface 350b of the transparent member 350 projected onto (e.g., overlapping) the display panel 100 may be greater than a second width W2 of the first side surface 350a of the transparent member 350 projected onto the display panel 100.

As mentioned above, the display device 500 according to the illustrated exemplary embodiment may include the optical member 330 and the transparent member 350 on a portion of the display area DA adjacent to the peripheral area BA of the display panel 100, and the covering member 370 may cover the optical member 330 and the transparent member 350. An image originating in the display area DA may be provided to the peripheral area BA via the inclined layers of the optical member 330, thereby displaying the image on the peripheral area BA of the display panel 100 at a viewing or front side of the display device 500.

Also, the transparent member 350 may be disposed in a space defined between the display panel 100, the optical member 330 and the covering member 370, thereby reducing a loss of luminance at the space when an image emitted from the display area DA of the display panel 100 passes through the optical member 330 and the covering member 370 in the third direction D3.

Referring to FIG. 3 again, the optical member 330 includes the optical sheets 331 in which the transparent film 336, the adhesive layer 334 and the reflective film 332 are alternately stacked. If the optical sheets 31 are cut so that the first side surface 330a of the optical member 330 has an overly small size, the transparent film 336 or the reflective film 332 may not be attached sufficiently to each other due to a small adhesive area of the adhesive layer 334. Accordingly, the first side surface 330a of the optical member 330 may have a minimum size greater than a predetermined area so as to maintain adhesion of the adhesive layer 334.

Also, referring to FIG. 5 again, a side surface of the covering member 370 may not contact with both the first side surface 330a and the upper surface 330c of the optical member 330 due to a physical feature of the covering member 370. Accordingly, a hollow space may be defined between the covering member 370 and the first side surface 330a of the optical member 330 on the display panel 100 without the transparent member 350 disposed therein. If an image emitted from a portion of the display area DA of the display panel 100 passes through the hollow space, the image may be undesirable refracted or reflected by an interface of the covering member 370 or the optical member 330. Accordingly, a luminance of the image may decrease corresponding to the hollow space, thereby a visual line may be recognized in the image displayed on the display device.

However, in the exemplary embodiment of the display device 500 according to the invention, the transparent member 350 having a relatively high transmissivity and a desired refractive index may be disposed in the space defined between the display panel 100, the covering member 370 and the optical member 330, thereby reducing the loss of luminance due to the space and improving display quality.

Figure 6:
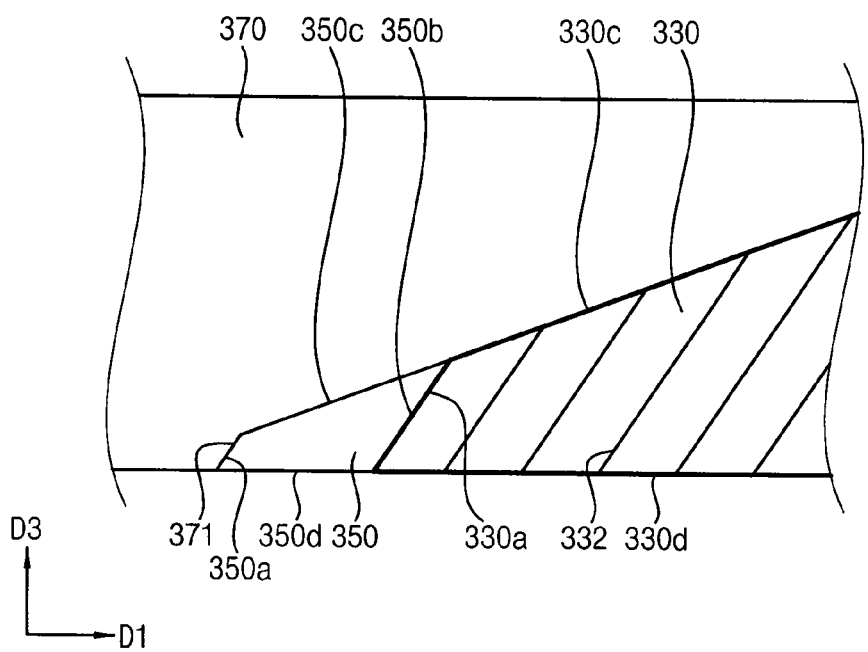
FIG. 6 is an enlarged cross-sectional view illustrating another exemplary embodiment of an optical member, a covering member and a transparent member in FIG. 2, according to the invention.

FIG. 6 is an enlarged cross-sectional view illustrating another exemplary embodiment of an optical member, a covering member and a transparent member according to the invention.

Referring to FIG. 6, a display device is substantially the same as the display device illustrated in FIG. 2 and FIG. 5 except that a portion of a side surface of the covering member 370 is reflective. Hereinafter, the identical elements are briefly described.

The display device may include an optical assembly disposed on a display panel. The optical assembly may include an optical member 330, a transparent member 350 and a covering member 370.

The optical member 330 may include a plurality of optical sheets in which a transparent film, an adhesive layer and a reflective film are stacked. The optical member 330 may include an upper surface 330c, a lower surface 330d and a first side surface 330a. The upper surface 330c of the optical member 330 may contact with the covering member 370. The lower surface 330d of the optical member 330 may contact with the display panel. The first side surface 330a of the optical member 330 may contact with the transparent member 350. The first side surface 330a of the optical member 330 may be reflective.

The transparent member 350 may include a transparent material. The transparent member 350 may have transmissivity equal to or greater than about 0.9. A refractive index of the transparent member 350 may be greater than about 1.0 and lower than about 3.0. The transparent member 350 may include an upper surface 350c, a lower surface 350d, a first side surface 350a and a second side surface 350b. The upper surface 350c of the transparent member 350 may contact with the covering member 370. The lower surface 350d of the transparent member 350 may contact with the display panel. The first side surface 350a of the transparent member 350 may contact with the covering member 370. The second side surface 350b of the transparent member 350 may contact with the first side surface 330a of the optical member 330.

In the illustrated exemplary embodiment, a portion of the covering member 370 contacting with the first side surface 350a of the transparent member 350 may be a reflective surface 371.

As mentioned above, the display device may include the optical member 330, the transparent member 350 and the covering member 370 on a portion of the display area adjacent to a peripheral area of the display panel, and a side surface of the optical member 330 contacting with the transparent member 350 and a portion of a side surface of the covering member 370 contacting with the transparent member 350 may be reflective, thereby increasing luminance of an image passing through the transparent member 350.

Figure 7:
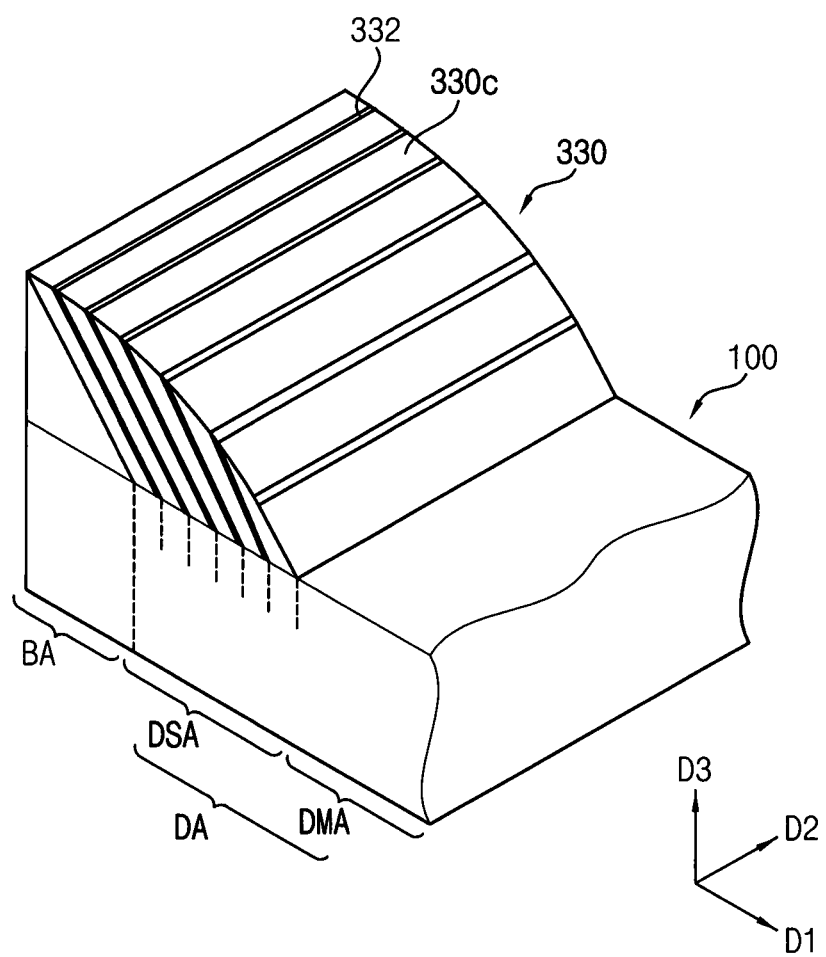
FIG. 7 is a perspective view partially illustrating an exemplary embodiment of an optical member, a supporting member and a display panel according to the invention.

FIG. 7 is a perspective view partially illustrating an exemplary embodiment of an optical member, a supporting member and a display panel according to the invention.

Referring to FIG. 7, a display device is substantially the same as the display device illustrated in FIG. 2 and FIG. 5 except that optical sheets of the optical member 330 correspond to a peripheral pixel area DSA of a display area DA. Hereinafter, the identical elements are briefly described.

The display device may include an optical assembly disposed on a display panel 100. The optical assembly may include an optical member 330 and a supporting member.

In the illustrated exemplary embodiment, the display area DA of the display panel 100 may include a main pixel area DMA, and a peripheral pixel area DSA adjacent to the main pixel area DMA. The display panel 100 may include a plurality of pixel rows or pixel columns extending in a second direction D2 in the peripheral pixel area DSA.

The optical member 330 may include a plurality of optical sheets in which a plurality of transparent films, adhesive layers and reflective films 332 are stacked. An upper surface 330c of the optical member 330 at which the optical sheets are cut may be a curved surface in a cross-sectional view. The transparent films disposed between the reflective films 332 of the optical member 330 may correspond to the pixel rows or the pixel columns in the peripheral pixel area DSA of the display panel 100. The optical member 330 may not overlap the main pixel area DMA of the display area DA. As indicated by the dotted lines partially extending in to the display panel 100, for example, surfaces of the transparent films contacting with the display panel 100 may overlap or coincide with the pixel rows and/or the pixel columns defined in the display panel 100.

As mentioned above, the exemplary embodiment of the display device according to the invention may be configured to emit an image from the peripheral pixel area DSA in the display area DA through the transparent films and in cooperation with the reflective films 332 of the optical member 330, thereby displaying the image on a peripheral area BA of the display panel 100.

Figure 8:
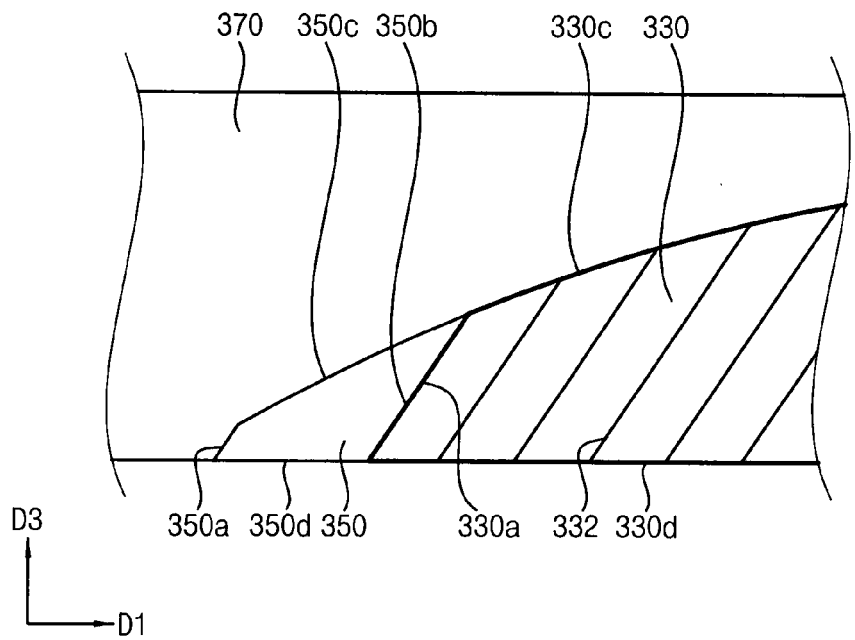
FIG. 8 is an enlarged cross-sectional view illustrating still another exemplary embodiment of an optical member, a covering member and a transparent member according to the invention.

FIG. 8 is an enlarged cross-sectional view illustrating still another exemplary embodiment of an optical member, a covering member and a transparent member according to the invention.

Referring to FIG. 8, a display device is substantially the same as the display device illustrated in FIG. 2 and FIG. 5 except that an upper surface 350c of the transparent member 350 and an upper surface 330c of the optical member 330 are curved surfaces. Hereinafter, the identical elements are briefly described.

In the illustrated exemplary embodiment, the transparent member 350 may include an upper surface 350c, a lower surface 350d, a first side surface 350a and a second side surface 350b. The upper surface 350c of the transparent member 350 may be a curved surface.

In the illustrated exemplary embodiment, the optical member 330 may include an upper surface 330c, a lower surface 330d and a first side surface 330a. The upper surface 330c of the optical member 330 may be a curved surface.

The upper surface 330c of the optical member 330 and the upper surface 350c of the transparent member 350 may lie in a continuous curved surface. As illustrated, for example, a curvature at a contact portion of the upper surface 330c of the optical member 330 with the first side surface 330a of the optical member 330 may be substantially the same as a curvature at a contact portion of the upper surface 350c of the transparent member 350 with the first side surface 350a of the transparent member 350.

Figure 9:
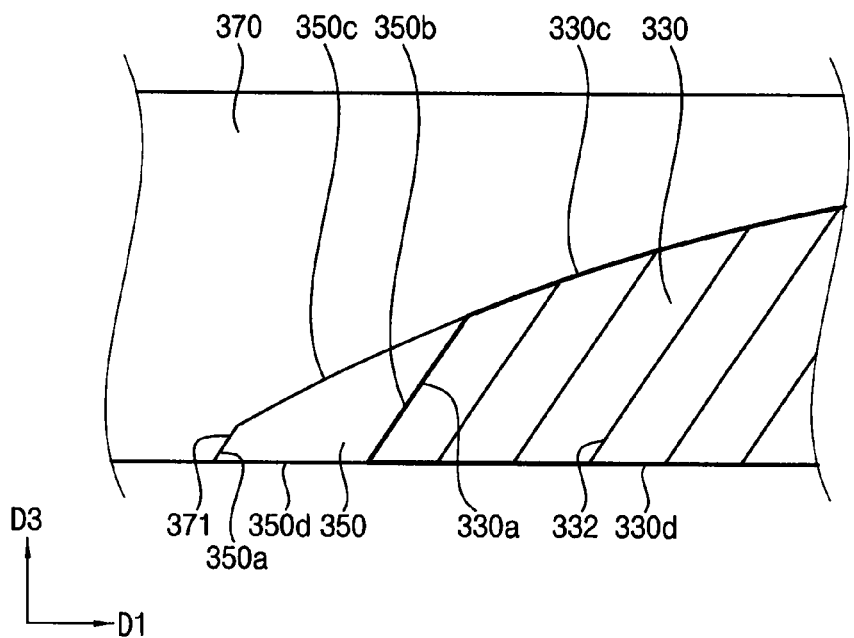
FIG. 9 is an enlarged cross-sectional view illustrating yet another exemplary embodiment of an optical member, a covering member and a transparent member according to the invention.

FIG. 9 is an enlarged cross-sectional view illustrating yet another exemplary embodiment of an optical member, a covering member and a transparent member according to the invention.

Referring to FIG. 9, a display device is substantially the same as the display device illustrated in FIG. 8 except that a portion of a covering member 370 contacting with a first side surface 350a of a transparent member 350 is a reflective surface 371. Hereinafter, the identical elements are briefly described.

In the illustrated exemplary embodiment, a transparent member 350 may include an upper surface 350c, a lower surface 350d, a first side surface 350a and a second side surface 350b. The upper surface 350c of the transparent member 350 may be a curved surface.

In the illustrated exemplary embodiment, a portion of a covering member 370 contacting with the first side surface 350a of the transparent member 350 may be a reflective surface 371.

In the illustrated exemplary embodiment, a first side surface 330a of an optical member 330 may contact with the second side surface 350b of the transparent member 350. The first side surface 330a of the optical member 330 may be reflective.

Figure 10:
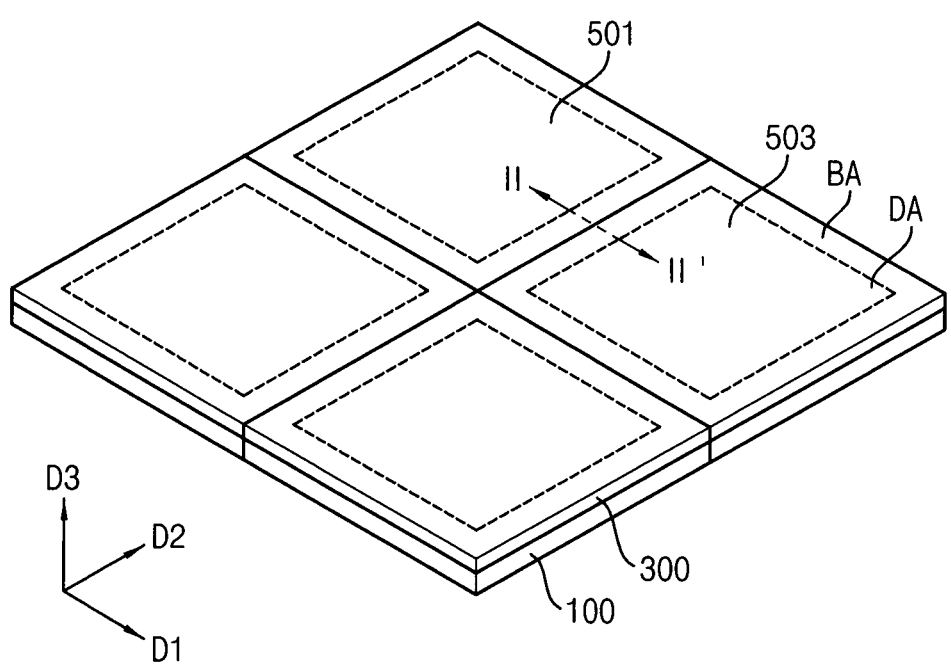
FIG. 10 is a perspective view illustrating another exemplary embodiment of a display device according to the invention.
Figure 11:
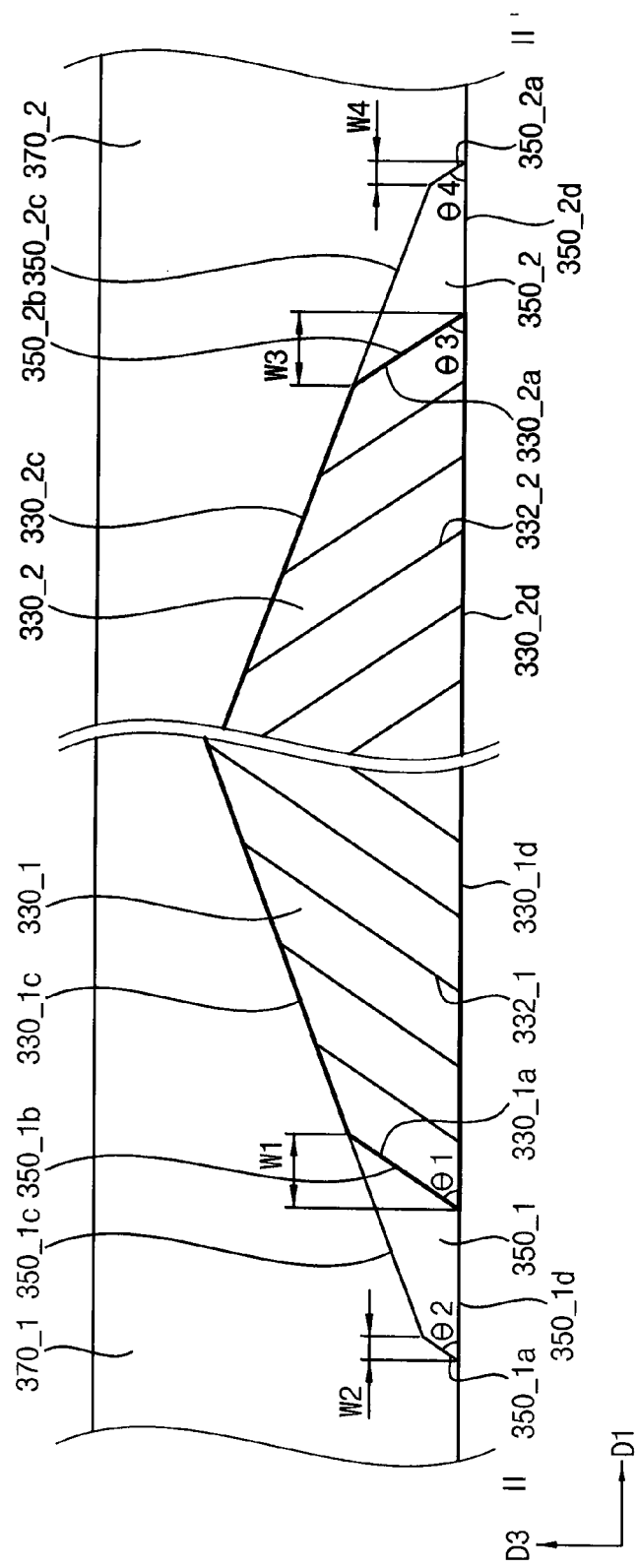
FIG. 11 is a cross-sectional view taken along line of II-II' in FIG. 10.

FIG. 10 is a perspective view illustrating another exemplary embodiment of a display device according to the invention. FIG. 11 is a cross-sectional view taken along line of II-II' in FIG. 10.

Referring to FIG. 10 and FIG. 11, a display device may include a plurality of display panels 100 adjacent to each other and a plurality of optical assemblies 300 respectively on the display panels 100. Each of the display panels 100 and the optical assemblies 300 may be substantially the same as the display panel 100 and the optical assembly 300 illustrated in FIG. 1 and FIG. 2. Hereinafter, the identical elements are briefly described.

In the illustrated exemplary embodiment, the display device may be a multi-panel display device including a plurality of display panels 100 disposed in a first direction D1, and a second direction D2 crossing the first direction D1. Referring to FIG. 10, for example, the display device may include a first sub-display device 501, and a second sub-display device 503 adjacent to the first sub-display device 501. The multi-panel display device may be configured to display a single image extending across an entire of the plurality of display panels 100. In an exemplary embodiment, for example, the first sub-display device 501 may be configured to display a first sub-image in the single image. The second sub-display device 503 may be configured to display a second sub-image adjacent to the first sub-image in the single image.

Each of the display panels 100 may include a display area DA configured to display a sub-image, and a peripheral area BA adjacent to the display area DA. The optical assemblies 300 may be disposed on the display panels 100, respectively.

The first sub-display device 501 may include a first optical member 330_1, a first transparent member 350_1 and a first covering member 370_1. The first optical member 330_1 may include an upper surface 330_1c, a lower surface 330_1d and a first side surface 330_1a. The upper surface 330_1c of the first optical member 330_1 may contact with the first covering member 370_1. The first side surface 330_1a of the first optical member 330_1 may contact with the first transparent member 350_1. The lower surface 330_1d of the first optical member 330_1 may contact with a first display panel. The first optical member 330_1 may include a plurality of reflective films 332_1.

The first transparent member 350_1 may include an upper surface 350_1c, a lower surface 350_1d, a first side surface 350_1a and a second side surface 350_1b. The upper surface 350_1c may contact with the first covering member 370_1. The lower surface 350_1d may contact with the first display panel. The first side surface 350_1a may contact with the first covering member 370_1. The second side surface 350_1b may contact with the first optical member 330_1. A first width W1 of the second side surface 350_1b of the first transparent member 350_1 projected onto the first display panel may be greater than a second width W2 of the first side surface 350_1a of the first transparent member 350_1 projected onto the first display panel. A first angle θ1 between the first display panel and the second side surface 350_1b of the first transparent member 350_1 may be substantially the same as a second angle θ2 between the first display panel and the first side surface 350_1a of the first transparent member 350_1.

The second sub-display device 503 may include a second optical member 330_2, a second transparent member 350_2 and a second covering member 370_2. The second optical member 330_2 may include an upper surface 330_2c, a lower surface 330_2d and a first side surface 330_2a. The upper surface 330_2c of the second optical member 330_2 may contact with the second covering member 370_2. The first side surface 330_2a of the second optical member 330_2 may contact with the second transparent member 350_2. The lower surface 330_2d of the second optical member 330_2 may contact with a second display panel. The second optical member 330_2 may include a plurality of reflective films 332_2.

The second transparent member 350_2 may include an upper surface 350_2c, a lower surface 350_2d, a first side surface 350_2a and a second side surface 350_2b. The upper surface 350_2c may contact with the second covering member 370_2. The lower surface 350_2d may contact with the second display panel. The first side surface 350_2a may contact with the second covering member 370_2. The second side surface 350_2b may contact with the second optical member 330_2. A third width W3 of the second side surface 350_2b of the second transparent member 350_2 projected onto the second display panel may be greater than a fourth width W4 of the first side surface 350_2a of the second transparent member 350_2 projected onto the second display panel. A third angle θ3 between the second display panel and the second side surface 350_2b of the second transparent member 350_2 may be substantially the same as a fourth angle θ4 between the second display panel and the first side surface 3502a of the second transparent member 350_2.

As mentioned above, according to one or more exemplary embodiment of the display device, the optical member and the transparent member may be disposed on a portion of the display area adjacent to the peripheral area, and the covering member may cover the optical member and the transparent member, thereby displaying an image on the peripheral area of the display device.

Also, the transparent member may be disposed in a space defined between the display panel, the optical member and the covering member, thereby reducing a border line displayed between the display area and the peripheral area which may be recognized as a luminance reduction due to the space.

The foregoing is illustrative of exemplary embodiments and is not to be construed as limiting thereof. Although a few exemplary embodiments have been described, those skilled in the art will readily appreciate that many modifications are possible in exemplary embodiments without materially departing from the novel teachings and advantages of the invention. Accordingly, all such modifications are intended to be included within the scope of exemplary embodiments as defined in the claims. In the claims, means-plus-function clauses are intended to cover the structures described herein as performing the recited function and not only structural equivalents but also equivalent structures. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display device comprising:
    a display panel comprising a display area configured to display an image, and a peripheral area adjacent to the display area; and
    an optical assembly on the display panel, and overlapping the display area and the peripheral area, the optical assembly comprising:
        a supporting member overlapping the peripheral area;
        an optical member comprising:
            an optical sheet provided in plural and comprising a transparent film therein;
            a first face contacting the display area of the display panel;
            a second face opposite to the first face and tilted with respect to the first face;
            a third face contacting the supporting member and connecting the first face and the second face to each other; and
            a fourth face opposite to the third face and connecting the first face and the second face to each other;
        a covering member contacting the second face of the optical member and covering the display panel; and
        a transparent member between the display panel, the optical member and the covering member, the transparent member defined by:
            a first face thereof contacting the display panel;
            a second face thereof opposite to the first face of the transparent member and contacting the covering member;
            a third face thereof connecting the first and second faces of the transparent member to each other and contacting the fourth face of the optical member; and
            a fourth face thereof opposite to the third face of the transparent member, connecting the first and second faces of the transparent member to each other and contacting the covering member, the transparent member continuously extending from the fourth face of the optical member is wider than each transparent film of the optical sheet.

2. The display device of claim 1, wherein the optical sheet further comprises a reflective film stacked with the transparent film therein.

3. The display device of claim 2, wherein
    the peripheral area extends in a first direction, and
    the transparent film and reflective film are stacked along a second direction substantially perpendicular to the first direction.

4. The display device of claim 2, wherein
    the display panel further comprises a pixel row or a pixel column in the display area; and
    a surface of the transparent film contacting the display panel overlaps the pixel row or the pixel column in the display area of the display panel.

5. The display device of claim 1, wherein the transparent member has a transmissivity equal to or greater than about 0.9.

6. The display device of claim 1, wherein the transparent member has a refractive index equal to or greater than about 1.0 and equal to or lower than about 3.0.

7. The display device of claim 1, wherein the fourth face of the optical member is reflective.

8. The display device of claim 1, wherein the second face of the optical member and the second face of the transparent member are flat surfaces tilted by a substantially same angle with respect to the display panel.

9. The display device of claim 1, wherein the second face of the optical member and the second face of the transparent member are continuously connected as a curved face with respect to the display panel.

10. The display device of claim 1, wherein a portion of the covering member contacting the fourth face of the transparent member is reflective.

11. The display device of claim 1, wherein a first width of the third face of the transparent member, overlapping the display panel, is greater than a second width of the fourth face of the transparent member, overlapping the display panel.

12. The display device of claim 1, wherein a first angle between the first and the fourth faces of the optical member, is substantially the same as a second angle between the first and the fourth faces of the transparent member.

13. The display device of claim 1, wherein
    a lower surface of the supporting member contacts the display panel, and
    a width of the supporting member, overlapping the display panel, decreases from the lower surface to a top of the supporting member.

14. The display device of claim 13, wherein the supporting member has a triangular shape in a cross-sectional view.

15. A display device comprising:
    a plurality of display panels respectively comprising a display area configured to display an image, and a peripheral area adjacent to the display area; and
    a plurality of optical assemblies respectively on the plurality of display panels, each overlapping the display area and the peripheral area of a respective display panel and comprising:
        a supporting member overlapping the peripheral area;
        an optical member comprising:
            an optical sheet provided in plural and comprising a transparent film therein;
            a first face contacting the display area of the respective display panel;
            a second face opposite to the first face and tilted with respect to the first face;
            a third face contacting the supporting member and connecting the first face and the second face to each other; and
            a fourth face opposite to the third face and connecting the first face and the second face to each other;
        a covering member contacting the second face of the optical member and covering the respective display panel; and
        a transparent member between the optical member, the covering member and the respective display panel, the transparent member defined by:
            a first face thereof contacting the respective display panel;
            a second face thereof opposite to the first face of the transparent member and contacting the covering member;
            a third face thereof connecting the first and second faces of the transparent member to each other and contacting the fourth face of the optical member; and
            a fourth face thereof opposite to the third face of the transparent member, connecting the first and second faces of the transparent member to each other and contacting the covering member, the transparent member continuously extending from the fourth face of the optical member is wider than each transparent film of the optical sheet.

16. The display device of claim 15, wherein the optical sheet further comprises a reflective film stacked with the transparent film therein.

17. The display device of claim 15, wherein the transparent member has a transmissivity equal to or greater than about 0.9.

18. The display device of claim 15, wherein a first width of the third face of the transparent member, overlapping the respective display panel, is greater than a second width of the fourth face of the transparent member, overlapping the respective display panel.

* * * * *